United States Patent

[11] 3,622,811

[72] Inventor Grover K. Houpt
Wayne, Pa.
[21] Appl. No. 804,232
[22] Filed Mar. 4, 1969
[45] Patented Nov. 23, 1971
[73] Assignee Automatic Timing and Controls, Inc.
King of Prussia, Pa.

[54] CIRCUIT FOR MEASURING VARIABLE TIMING INTERVALS
5 Claims, 1 Drawing Fig.

[52] U.S. Cl. .................... 307/293, 307/251, 307/288, 317/142, 328/131
[51] Int. Cl. .................... H03k 17/28
[50] Field of Search .................... 307/246, 251, 293, 288, 289, 291; 328/129, 130, 131; 317/141, 142, 148.5

[56] References Cited

UNITED STATES PATENTS

| | | | |
|---|---|---|---|
| 2,845,548 | 7/1958 | Sillman et al. | 307/293 X |
| 2,892,101 | 6/1959 | Bright | 307/293 X |
| 3,139,539 | 6/1964 | Hewett | 307/293 X |
| 3,403,268 | 9/1968 | Beckner et al. | 307/293 |
| 3,003,069 | 10/1961 | Clapper | 307/289 |

OTHER REFERENCES

Pub. I " Wide-Range Timer" by Melnyk, IBM Tech. Disclosure Bulletin, Vol. 9, No. 3, Aug. 1966, page 339

Pub. II " Self-Correcting Time Interval Storage Device" by Beausoleil et al., IBM Tech. Disclosure Bulletin, Vol. 9, No. 10, Mar. 1967, Pages 1,435- 1,436

*Primary Examiner*—Stanley D. Miller, Jr.
*Attorneys*—Nelson E. Kimmelman and Maleson, Kimmelman & Ratner

ABSTRACT: This timing circuit includes a first FET which is normally conducting in the absence of a starting signal and is in shunt with a timing capacitor. The timing capacitor is in series with a resistor and their junction is connected to the first FET and to the gate of a second FET. The second FET has its source biased at a voltage determined by the setting on a timing dial potentiometer. It will not conduct until the charge built up on the timing capacitor, after the first FET turns off, exceeds the bias and the inherent pinch-off voltage of the second FET. When the second FET conducts, a voltage is developed across another resistor which is applied to turn on a transistor that is in series with a resistor. When the transistor turns on, the voltage across the latter resistor turns on two other transistors in series with an inductor. Energization of the inductor actuates a switch associated with the load circuit which is to be controlled. A diode is connected between the second FET and the series-connected transistors to keep the second FET conductive despite an increase in the setting of the dial potentiometer after completion of the timing cycle, but before the starting circuit is deengerized.

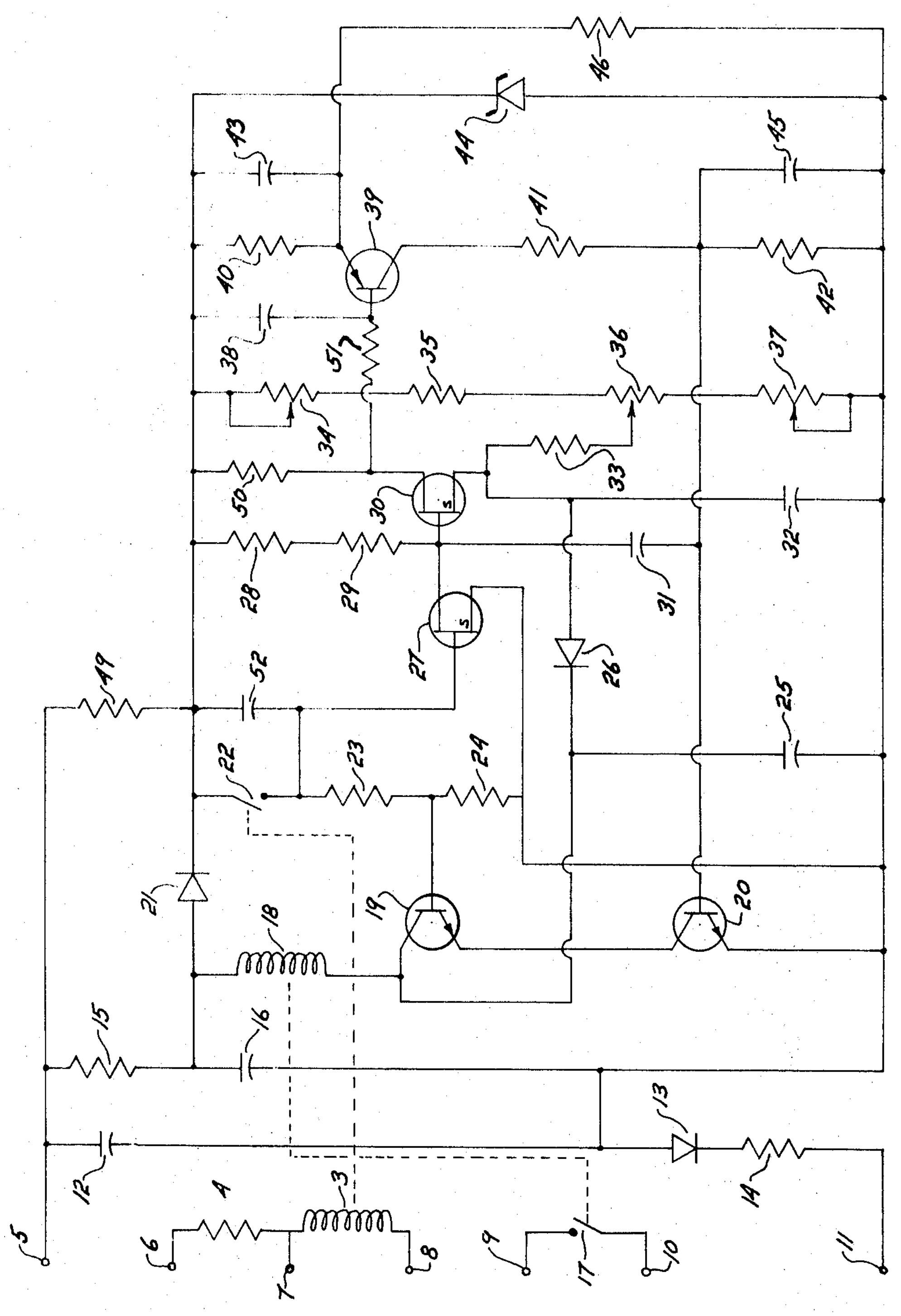
INVENTOR.
GROVER V. HOUPT
BY
Maleson, Kimmelman + Ratner
ATTORNEYS

CIRCUIT FOR MEASURING VARIABLE TIMING INTERVALS

BACKGROUND OF THE INVENTION

1. Field of the Invention

This invention relates to all-electronic timing circuits.

2. Description of the Prior Art

Previous all-electronic timing circuits were characterized by being expensive or having low accuracy. It is therefore desirable to have an all-electronic timing circuit which is cheaper to make but still has high accuracy and permits resetting of the timing dial for a longer period of time even after the (delay) timing cycle has been completed.

SUMMARY OF THE INVENTION

The invention comprises a first switching means which is normally conductive before the beginning of a timing cycle, timing cycle starting means for energizing said first switching means whereupon it becomes nonconductive, a timing capacitor in series with a first resistor and connected at the junction thereof to said first switching means, said capacitor and said resistor being coupled to said DC supply for energization thereby. There is also a second switching means in circuit with a second resistor and a variable resistor, said second switching means being coupled to said junction, said variable resistor being settable thereby to bias said second switching means against conduction until said timing capacitor attains a predetermined charge relative to said bias. A third switching means coupled to said second switching means is rendered conductive by the passage of current through said second resistor upon conduction of said second switching means, and means including fourth and fifth switching means coupled to said third switching means and to said DC supply which responds to conduction through said third switching means for controlling a load connected to said timing circuit.

BRIEF DESCRIPTION OF THE DRAWING

The sole FIGURE is a schematic drawing of one form of the invention.

DETAILED DESCRIPTION OF THE DRAWING

Referring to the sole figure there are shown input power terminals 5 and 11 which are adapted to be connected to the line. These two terminals energize a half-wave power supply consisting of the filter capacitor 12, the rectifier 13 and resistance 14, the latter being used to limit surges. There is an additional AC filter section comprising the resistor 15 and capacitor 16 connected in series. The diode 21 is used to isolate the rest of the circuit from the power supply and thus acts as a load isolator. Zener diode 44 is in parallel with the filter capacitor 16 for regulating the voltage across it.

In order to initiate a timing cycle, direct current is applied either through the lower voltage input terminals 7 and 8 or through the higher voltage input terminals 6 and 8. The coil 3 is coupled to a switch 22, which may be of the magnetic reed switch-type, thereby closing it. Consequently, current flows downward from terminal 5 through resistors 23 and 24 causing a voltage at their junction which, when applied to the transistor 19, enables it to conduct. In addition, the voltage drop across the resistor 23 causes a voltage to be applied to the gate of the field effect transistor (FET) 27 which renders it nonconductive. So long as transistor 27 was previously conducting, it prevented any charge from being built up across the timing capacitor 31.

When transistor 27 is shut off, timing capacitor starts to charge up through resistors 28 and 29, the charge on it being applied to the gate of the second FET 30. Just prior to the occurrence of the starting signal the voltage on the source of FET 30 was such that, relative to the voltage on the gate taking into account the inherent pinch-off voltage of the FET 30, the FET was nonconductive. As the timing capacitor 31 charges, it will approach the sum of the pinch-off voltage and the voltage determined by the setting of the dial-timing potentiometer 36.

When the charge stored in capacitor 31 equals the sum of the pinch-off voltage and the timing voltage determined by the setting of the dial potentiometer 36, FET 30 will conduct through a current-limiting resistor 33. The latter is in series with the wiper on potentiometer 36 and current through it flows through potentiometer 37 to ground. This current flows through resistor 50 causing the voltage on the base of transistor 39 to go more negative rendering it conductive. Before FET 30 conducts the current through resistors 40 and 46, which are in series, causes a voltage drop at their junction which is sufficient to keep the emitter biased so that transistor 39 is nonconductive. Thus current flows through the entire branch comprising resistor 40, transistor 39 and resistors 41 and 42 to ground. As a result of this current flow the voltage at the junction of resistors 41 and 42 goes more positive and therefore the voltage on both plates of capacitor 31 goes more positive so that the gate of FET 30 becomes more positive and it conducts more heavily. Consequently, the action of transistor 39 is to cause a regenerative effect.

This voltage change also causes the base of transistor 20 to go more positive and therefore transistor 20 turns on and, in turn, this causes transistor 19 to turn on, it having previously been enabled by the closing of switch 22 but lacked a current path attached to its emitter. Consequently, current flows through coil 18 and transistors 19 and 20 to ground thereby actuating switch 17 which is connected to the output terminals 9 and 10. Switch 17 is a switch which may be connected for the operation of any desired load device.

A word now about the reset subcircuit. This reset subcircuit is applicable at any time whether or not the circuit is operating in the course of a timing cycle or not. It is accomplished by opening the circuit used for starting the timing operation, i.e., opening the circuit at terminals 6, 7 and 8. When this is done, no voltage is applied to the base of transistor 27 so that it then becomes conductive again and provides a path for bleeding off the charge on the upper plate of timing capacitor 31 to ground. At the same time, opening of the switch 22 deenergizes coil 18 and transistor 19 by rendering the latter nonconductive and therefore the switch 17 opens, if it was previously closed, or is kept open if it was previously open. If this were not the case, and the dial-timing potentiometer 36 had been set for the minimum resistance in the series with resistor 33 i.e., if the wiper of the dial potentiometer 36 had been moved down to its downmost position) FET 30 could conduct even if its gate were at ground potential. Since transistor 30 could conduct, so could transistors 39 and 20 and therefore if transistor 19 is not cut off current could go through the coil 18.

The diode 26 is used as a latch. If it were not present, after the timing cycle had been completed, the switch 17 would remain closed unless the timing dial potentiometer 36 is moved upward to a longer time setting whereupon switch 17 would open again for an additional time period. The presence of diode 26 prevents reopening of switch 17 until the shorting circuit (6, 7, 8) is deenergized.

During the completion of the timing cycle, the collector of transistor 19 is effectively at the voltage existing at the junction of resistor 15 and capacitor 16 and the cathode of anode 26 is connected to the source of FET 30. Before the completion of the timing circuit, when transistors 19 and 20 are both still off, the diode 26 is nonconductive. After completion of the timing cycle, the transistors 19 and 20 both become conductive so that the collector of transistor 19 goes effectively to the ground potential and so does the cathode of diode 26. Consequently, diode 26 conducts and pulls the source electrode of FET 30 down to ground potential so that regardless of the setting or resetting of the dial-timing potentiometer 36, the source of 30 is clamped to ground and therefore it remains conductive.

The capacitors 25, 38, 43, 45, and 32 are noise filters.

The resistor 34 is used as the range setting resistor and the resistor 37 is used as the zero setting resistor in calibration of the dial attached to the potentiometer 36.

I claim:

1. A timing circuit adapted to be connected to a DC supply comprising:
   a. a first switching means which is normally conductive before the beginning of a timing cycle
   b. timing cycle starting means for energizing said first switching means whereupon it becomes nonconductive,
   c. a timing capacitor in series with a first resistor and connected at the junction thereof to said first switching means, said capacitor and said resistor being coupled to said DC supply for energization thereby,
   d. a second switching means in circuit with a second resistor and a variable resistor, said second switching means having one terminal thereof coupled to said junction and a second terminal coupled to said variable resistor, said variable resistor being settable thereby to apply a substantially unvarying threshold signal to said second switching means to prevent its conduction until said timing capacitor attains a predetermined charge relative to said threshold signal,
   e. a third switching means coupled to said second switching means which is rendered conductive by and during the passage of current through said second resistor upon conduction of said second switching means, and
   f. means including fourth and fifth switching means coupled to said third switching means and to said DC supply which responds to conduction through said third switching means for controlling a load connected to said timing circuit.

2. The timing circuit according to claim 1 wherein said fourth and fifth switching means are connected in series with an inductor and where said fourth switching means is enabled for conduction by actuation of said starting means but is not rendered conductive until conduction through said third switching means turns on said fifth switching means.

3. The timing circuit according to claim 2 wherein said third switching means is in circuit with a third resistor wherein said fifth switching means is a solid-state device having one terminal connected to said third resistor, and wherein said fourth switching means is a solid-state device having one terminal connected to a second terminal of said fifth switching means, a second terminal connected to said starting means and a third terminal connected to said inductor.

4. A timing circuit adapted to be connected to a DC supply comprising:
   a. a first switching means which is normally conductive before the beginning of a timing cycle,
   b. timing cycle starting means for energizing said first switching means whereupon it becomes nonconductive,
   c. a timing capacitor in series with a first resistor and connected at the junction thereof to said first switching means, said capacitor and said resistor being coupled to said DC supply for energization thereby,
   d. a second switching means in circuit with a second resistor and a variable resistor, said second switching means being coupled to said junction, said variable resistor being settable thereby to bias said second switching means against conduction until said timing capacitor attains a predetermined charge relative to said bias,
   e. a third switching means coupled to said second switching means which is rendered conductive by and during the passage of current through said second resistor upon conduction of said second switching means,
   f. means including fourth and fifth switching means coupled to said third switching means and to said DC supply which responds to conduction through said third switching means for controlling a load connected to said timing circuit, and
   g. latching means coupled between said second and fourth switching means for maintaining said second switching means conductive after completion of said timing cycle regardless of any subsequent change in the setting of said variable resistor.

5. The timing circuit according to claim 4 wherein said latching means includes a diode whose cathode is coupled to said fourth switching means and whose anode is coupled to said second switching means.

* * * * *